米12,269,221 B2

(12) United States Patent
Konami

(10) Patent No.: US 12,269,221 B2
(45) Date of Patent: Apr. 8, 2025

(54) FIBER-REINFORCED RESIN MOLDING MATERIAL AND METHOD FOR MANUFACTURING SAME, AND FIBER-REINFORCED RESIN MOLDED ARTICLE

(71) Applicant: Mitsubishi Chemical Corporation, Tokyo (JP)

(72) Inventor: Yukichi Konami, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 815 days.

(21) Appl. No.: 17/368,889

(22) Filed: Jul. 7, 2021

(65) Prior Publication Data

US 2021/0331428 A1 Oct. 28, 2021

Related U.S. Application Data

(60) Division of application No. 16/655,841, filed on Oct. 17, 2019, now abandoned, which is a continuation of
(Continued)

(30) Foreign Application Priority Data

Apr. 25, 2017 (JP) .................................. 2017-085860

(51) Int. Cl.
*B29C 70/20* (2006.01)
*B29B 15/12* (2006.01)
(Continued)

(52) U.S. Cl.
CPC ............ *B29C 70/20* (2013.01); *B29B 15/122* (2013.01); *B29C 70/22* (2013.01); *B29K 2031/00* (2013.01); *B29K 2307/04* (2013.01)

(58) Field of Classification Search
CPC ....... B29C 70/20; B29C 70/22; B29B 15/122; B29K 2031/00; B29K 2307/04
(Continued)

(56) References Cited

U.S. PATENT DOCUMENTS 5,445,701 A * 8/1995 Koba .................... B29C 70/504
118/118
2009/0126974 A1* 5/2009 Yuasa ................... B29C 70/506
174/250
(Continued)

FOREIGN PATENT DOCUMENTS

| CN | 102380957 A | 3/2012 |
| CN | 103987764 A | 8/2014 |

(Continued)

OTHER PUBLICATIONS

Chinese Office Action issued Sep. 15, 2021 In Chinese Patent Application No. 201880016576.3 (with English translation), 26 pages.
(Continued)

*Primary Examiner* — Jeffrey M Wollschlager
*Assistant Examiner* — Xue H Liu
(74) *Attorney, Agent, or Firm* — Oblon, McClelland, Maier & Neustadt, L.L.P.

(57) ABSTRACT

A fiber-reinforced resin molding material may include a reinforcement fiber sheet of basis weight 200 to 3,000 g/m$^2$ is impregnated with a resin composition to a resin composition of 25 to 55 vol. % of 100% total fiber-reinforced resin molding material mass. A thickness from a first surface to a position of 10 mass % resin composition being d1 (μm), and a thickness from an opposite surface to a position occupied by 10 mass % resin composition being d2 (μm) giving an absolute value, |d1−d2|, of 50 μm or less. A method for manufacturing such a material may include: impregnating a
(Continued)

reinforcement fiber sheet including (i) a unidirectional sheet with plural continuous parallel fibers, (ii) a woven fabric of woven continuous fibers, and/or (iii) a non-crimp fabric containing continuous fibers of resin composition having an initial viscosity of ≤1 Pa·s and a viscosity of 5,000 to 150,000 Pa·s after 7 days at 25° C.

12 Claims, 1 Drawing Sheet

Related U.S. Application Data application No. PCT/JP2018/016779, filed on Apr. 25, 2018.

(51) Int. Cl.
  *B29C 70/22* (2006.01)
  *B29K 31/00* (2006.01)
  *B29K 307/04* (2006.01)

(58) Field of Classification Search
  USPC ............................................. 264/136
  See application file for complete search history.

(56) References Cited

U.S. PATENT DOCUMENTS

| | | | |
|---|---|---|---|
| 2013/0327478 A1 | 12/2013 | Ichino et al. | |
| 2015/0306790 A1 | 10/2015 | Spyrou et al. | |
| 2016/0115283 A1* | 4/2016 | Yin | C08J 5/043 523/400 |
| 2018/0001588 A1 | 1/2018 | Naito et al. | |

FOREIGN PATENT DOCUMENTS

| | | |
|---|---|---|
| CN | 105377939 A | 3/2018 |
| EP | 1 541 312 A1 | 6/2005 |
| GB | 1 428 139 | 3/1976 |
| JP | 2007-261141 A | 10/2007 |
| JP | 2010-195844 A | 9/2010 |
| JP | 2012-187229 A | 9/2012 |
| JP | 2012167229 A * | 9/2012 |
| JP | 2012-201067 A | 10/2012 |
| JP | 2014-162858 A | 9/2014 |
| JP | 2016-3938 A | 1/2015 |
| JP | 2015-209549 A | 11/2015 |
| WO | 02/14055 | 2/2002 |
| WO | 2012/118208 A1 | 9/2012 |
| WO | 2017/110816 A1 | 8/2017 |

OTHER PUBLICATIONS

Combined Chinese Office Action and Search Report issued May 19, 2021 in corresponding Chinese Patent Application No. 201880016576.3 (with English Translation), 23 pages.
Office Action issued Jun. 8, 2021 in corresponding Japanese Patent Application No. 2019-161366 (with English Translation), 7 pages.
Office Action mailed Jun. 16, 2020, in co-pending U.S. Appl. No. 16/655,841.
Office Action mailed Oct. 30, 2020, in co-pending U.S. Appl. No. 16/655,841.
Office Action mailed Apr. 13, 2021, in co-pending U.S. Appl. No. 16/655,841.
Combined Chinese Office Action and Search Report issued Dec. 1, 2020 in corresponding Chinese Patent Application No. 201880016578.3 (with English Translation), 25 pagas.
Extended European Search Report issued Jan. 21, 2021 in corresponding European Patent Application No. 18791381.9, 11 pages.
Jicheng Zuo, "Basic Principle and Process for Mold Processing of Polymeric Materials", Beijing University of Technology Press, pp. 256-257 (with English Translation), (13 pages).
Partial Supplementary European Search Report issued on Aug. 27, 2020 in Patent Application No. 18791381.9, 12 pages.
International Search Report issued Jul. 31, 2018 in PCT/JP2018/016779, filed on Apr. 25, 2018 (with English translation).
Japanese Office Action issued May 14, 2019 in Japanese Application 2018-528981 (with English translation).
European Office Action issued Dec. 9, 2021 in European Patent Application No. 18791381.9, 5 pages.

\* cited by examiner

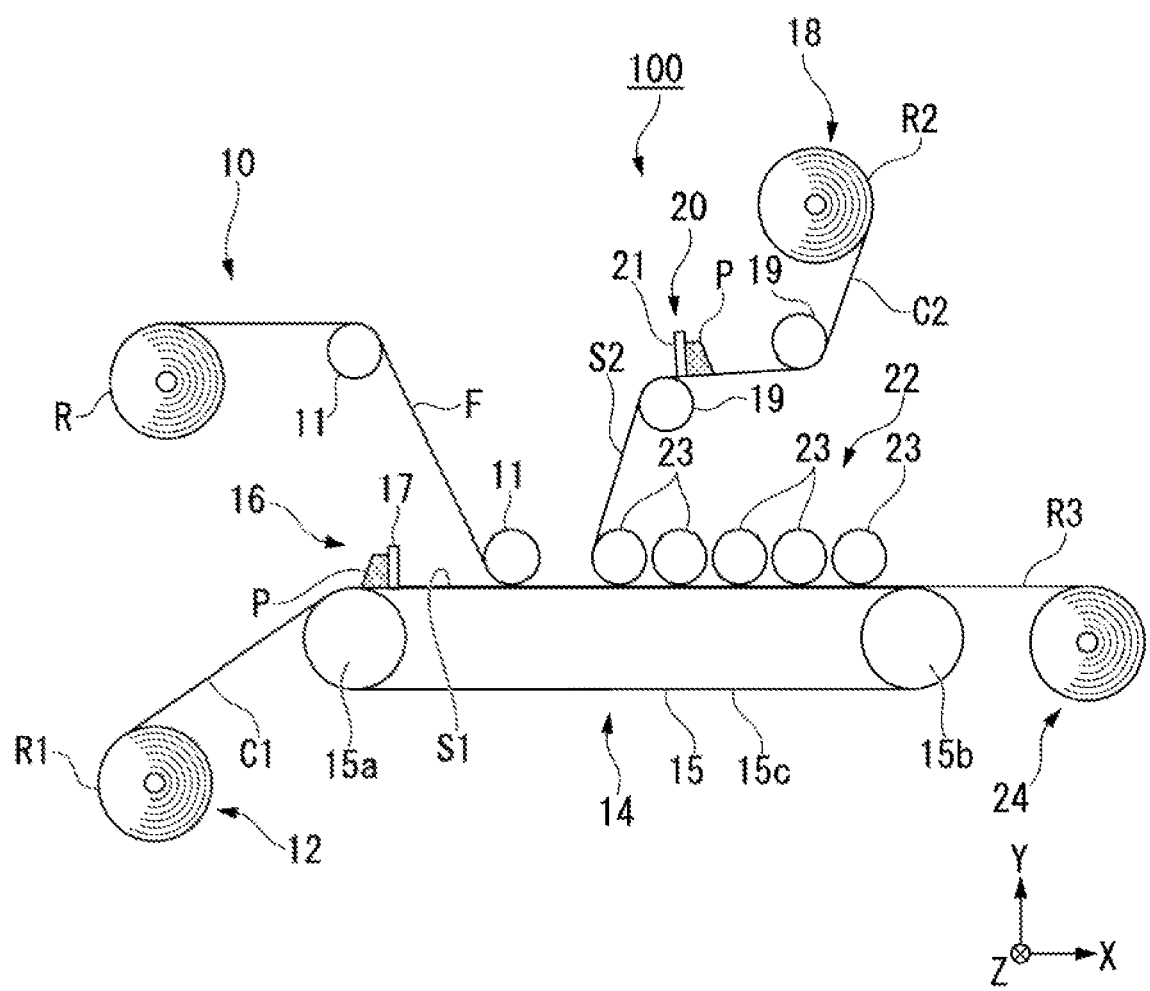

FIBER-REINFORCED RESIN MOLDING MATERIAL AND METHOD FOR MANUFACTURING SAME, AND FIBER-REINFORCED RESIN MOLDED ARTICLE

CROSS-REFERENCE TO RELATED APPLICATIONS

The present application is a division of U.S. application Ser. No. 16/655,841, filed Oct. 17, 2019, and published as US 2020/0047430 A1 on Feb. 13, 2020, which was a bypass continuation of PCT/JP2018/016779, filed Apr. 25, 2018, claiming the benefit of priority of Japanese Appl. No. 2017-085860, filed Apr. 25, 2017, the content of each of which is incorporated by reference herein.

TECHNICAL FIELD

The present invention relates to a fiber-reinforced resin molding material and a method for manufacturing thereof, and a fiber-reinforced resin molded article.

BACKGROUND ART

For structural materials such as aircrafts, vehicles, ships, and buildings and sports equipment such as golf shafts, fishing rods, and tennis rackets, fiber-reinforced resin molded articles are widely used since these are lightweight and have a high strength.

As a fiber-reinforced resin molding material that is used for manufacturing of a fiber-reinforced resin molded article, a prepreg in which a reinforcement fiber sheet formed of continuous fibers (long fibers) formed of reinforcement fibers is impregnated with a resin composition is widely used. For example, a plurality of prepregs are laminated in a press tool, and then heated and pressed by the press tool to obtain a fiber-reinforced resin molded article. In many cases, a thermosetting resin composition is used as a resin composition in a prepreg, and an epoxy resin composition is frequently used in view of good mechanical properties (Patent Literatures 1 and 2).

CITATION LIST

Patent Literature

[Patent Literature 1] JP 2012-167229
[Patent Literature 2] JP 2015-209549

DISCLOSURE OF INVENTION

Technical Problem

In a case where it is possible to obtain a fiber-reinforced resin molded article which is lighter in weight and higher in strength than a fiber-reinforced resin molded article using a conventional prepreg as in Patent Literatures 1 and 2, it is useful in various fields. In a case where a conventional prepreg is used, the number of prepregs to be laminated is likely to be large particularly in manufacturing of a fiber-reinforced resin molded article having a large thickness, and in a case where the laminated prepregs are misaligned, it is difficult to re-laminate the prepregs, and the manufacturing is complicated.

An object of the invention is to provide a fiber-reinforced resin molding material with which a lightweight and high-strength fiber-reinforced resin molded article can be easily obtained and a method for manufacturing the fiber-reinforced resin molding material, and a liber-reinforced resin molded article using the fiber-reinforced resin molding material.

Solution to Problem

The invention may have a configuration: [1] A fiber-reinforced resin molding material including: a reinforcement fiber sheet whose basis weight is 200 g/m$^2$ or greater and 3,000 g/m$^2$ or less; and a resin composition which is impregnated into the reinforcement fiber sheet such that a content of the resin composition is 25 volume % or greater and 55 volume % or less, in which in a case where a total amount of the resin composition contained in the fiber-reinforced resin molding material is 100 mass %, a thickness from a first surface in a thickness direction of the fiber-reinforced resin molding material to a position occupied by 10 mass % of the resin composition is represented by d1 (μm), and a thickness from a second surface opposite to the first surface to a position occupied by 10 mass % of the resin composition is represented by d2 (μm), an absolute value (|d1−d2|) of a difference between d1 and d2 is 50 μm or less.

[2] The fiber-reinforced resin molding material according to [1], in which the reinforcement fiber sheet is formed of at least one selected from the group consisting of a unidirectional sheet in which a plurality of continuous fibers are arranged in parallel in one direction, a woven fabric in which continuous fibers are woven, and a non-crimp fabric containing continuous fibers.

[3] The fiber-reinforced resin molding material according to [2], in which the reinforcement fiber sheet is a non-crimp fabric.

[4] The fiber-reinforced resin molding material according to any one of [1] to [3], in which R representing a ratio of the sum of d1 and d2 to the basis weight of the reinforcement fiber sheet is 0.2 or greater and 0.5 or less.

[5] The fiber-reinforced resin molding material according to any one of [1] to [4], in which at least one of d1 and d2 is within a range of 5 μm or greater and 750 μm or less.

[6] The fiber-reinforced resin molding material according to any one of [1] to [5], in which the basis weight of the reinforcement fiber sheet is 400 g/m$^2$ or greater.

[7] The fiber-reinforced resin molding material according to any one of [1] to [6], in which the resin composition contains a vinyl ester resin.

[8] A fiber-reinforced resin molded article which is obtained by molding the fiber-reinforced resin molding material according to any one of [1] to [7].

[9] A method for manufacturing a fiber-reinforced resin molding material, including: impregnating a reinforcement fiber sheet formed of at least one selected from the group consisting of a unidirectional sheet in which a plurality of continuous fibers are arranged in parallel in one direction, a woven fabric in which continuous fibers are woven, and a non-crimp fabric containing continuous fibers with a resin composition having an initial viscosity of 1 Pa·s or less and having a viscosity of 5,000 Pa·s or greater and 150,000 Pa·s or less after leaving for 7 days at 25° C.

Advantageous Effects of Invention

Ina case where the fiber-reinforced resin molding material according to the invention, a lightweight and high-strength fiber-reinforced resin molded article can be easily obtained.

According to the method for manufacturing a fiber-reinforced resin molding material of the invention, a fiber-reinforced resin molding material with which a lightweight and high-strength fiber-reinforced resin molded article can be easily obtained can be manufactured.

The fiber-reinforced resin molded article according to the invention can be easily manufactured. In addition, it is lightweight and has a high strength.

BRIEF DESCRIPTION OF DRAWINGS

FIG. 1 is a schematic configuration diagram showing an example of a manufacturing apparatus used for manufacturing a fiber-reinforced resin molding material according to the invention.

MODE FOR CARRYING OUT THE INVENTION

[Fiber-Reinforced Resin Molding Material]

In a fiber-reinforced resin molding material according to the invention, a reinforcement fiber sheet is impregnated with a resin composition.

The reinforcement fiber sheet is at least one selected from the group consisting of a unidirectional sheet (UD sheet) in which a plurality of continuous fibers are arranged in parallel in one direction, a woven fabric (cloth material) in which continuous fibers are woven, and a non-crimp fabric (NCF) containing continuous fibers.

In the invention, the continuous fiber means a reinforcement fiber that is continuous over a length of 75 mm or longer, preferably 50,000 mm or shorter, and more preferably 100 mm or longer and 10,000 mm or shorter in at least one direction. The upper limit of the range of the length may be a winding amount of carbon fiber, that is a raw material of the reinforcement fiber sheet, per one bobbin.

As the reinforcement fiber sheet, any one of a unidirectional sheet, a woven fabric, and a non-crimp fabric may be used alone, or two or more of a unidirectional sheet, a woven fabric, and a non-crimp fabric may be used in combination. The reinforcement fiber sheet is preferably a woven fabric or a non-crimp fabric in view of strength. A non-crimp fabric is more preferable since a reinforcement fiber composite molded article having excellent mechanical properties with small crimps of continuous fibers is obtained.

The weaving method for the woven fabric is not particularly limited, and examples thereof include plain weave, twill weave, satin weave, cord weave, and triaxial weave.

The non-crimp fabric is a sheet-like substrate in which a plurality of continuous fibers are integrated by auxiliary fiber yarn forming a warp-knitted structure without crossing each other. A known aspect can be employed as the non-crimp fabric, and examples thereof include a form having one or more layers in which a plurality of continuous fibers are arranged in parallel in layers in one direction. In a case where the non-crimp fabric has two or more layers, fiber axis directions of the continuous fibers of the layers may be parallel to each other or may intersect.

The auxiliary fiber yarn is not particularly limited, and examples thereof include monofilament yarn or multifilament yarn made of polyester, polyamide, polyethylene, polylactic acid, or the like, aramid fibers, cotton yarn, and silk yarn.

The continuous fiber is not particularly limited, and examples thereof include inorganic fibers, organic fibers, metallic fibers, and reinforcement fibers having a hybrid structure obtained by combining the above fibers.

Examples of the inorganic fibers include carbon fibers, graphite fibers, silicon carbide fibers, alumina fibers, tungsten carbide fibers, boron fibers, and glass fibers. Examples of the organic fibers include aramid fibers, high-density polyethylene fibers, other general nylon fibers, and polyester fibers. Examples of the metallic fibers include stainless steel fibers and iron fibers. Metal-coated carbon fibers may also be included. The continuous fibers may be used singly or in combination of two or more types thereof. The average fiber diameter of the continuous fibers is preferably 1 μm or greater and 50 μm or less, and more preferably 5 μm or greater and 20 μm or less.

As the continuous fibers, carbon fibers are preferable in view of mechanical properties such as a strength of a fiber-reinforced resin molded article.

The carbon fibers preferably have a strand tensile strength of 1.0 GPa or greater and 9.0 GPa or less, and more preferably 1.5 GPa or greater and 9.0 GPa or less, measured according to JIS R 7601: 1986.

The carbon fibers preferably have a strand tensile elastic modulus of 150 GPa or greater and 1,000 GPa or less, and more preferably 200 GPa or greater and 1,000 GPa or less, measured according to JIS R 7601: 1986.

The basis weight of the reinforcement fiber sheet is 200 g/m$^2$ or greater and 3,000 g/m$^2$ or less, preferably 300 g/m$^2$ or greater and 2,500 g/m$^2$ or less, and more preferably 400 g/m$^2$ or greater and 2,000 g/m$^2$ or less. In a case where the basis weight of the reinforcement fiber sheet is 200 g/m$^2$ or greater, preferably 300 g/m$^2$ or greater, and more preferably 400 g/m$^2$ or greater, the number of reinforcement fiber sheets to be laminated can be reduced even in manufacturing of a fiber-reinforced resin molded article having a large thickness, and excellent workability is obtained. Accordingly, the fiber-reinforced resin molded article can be easily manufactured. In addition, a high-strength fiber-reinforced resin molded article can be obtained, and the performance variation of the fiber-reinforced resin molded article to be obtained is also small. Ina case where the basis weight of the reinforcement fiber sheet is 3,000) g/m$^2$ or less, preferably 2,500 g/m$^2$ or less, and more preferably 2,000 g/m$^2$ or less, the impregnation properties of the resin composition into the reinforcement fiber sheet is excellent.

The content of the resin composition in the fiber-reinforced resin molding material according to the invention is 25 volume % or greater and 55 volume % or less, preferably 30 volume % or greater and 50 volume % or less, and more preferably 35 volume % or greater and 45 volume % or less with respect to the total volume of the fiber-reinforced resin molding material. In a case where the content of the resin composition is 55 volume % or less, preferably 50 volume % or less, and more preferably 45 volume % or less, a lightweight fiber-reinforced resin molded article can be obtained. In addition, the fiber-reinforced resin molded article has a high strength due to a relatively high proportion of the continuous fibers. Moreover, it is possible to suppress an excessive increase in tackiness of a surface of the fiber-reinforced resin molding material. Accordingly, for example, even in a case where a plurality of fiber-reinforced resin molding materials are misaligned when being laminated, and the fiber-reinforced resin molding materials laminated once are re-laminated, it is possible to suppress work difficulties caused by adhesion between the fiber-reinforced resin molding materials. In a case where the content of the resin composition is 25 volume % or greater, preferably 30 volume % or greater, and more preferably 35 volume % or greater, it is possible to suppress a deterioration in appearance of the fiber-reinforced resin molded article due to the occurrence of resin deficiency.

In a case where the total amount of the resin composition contained in the fiber-reinforced resin molding material is 100 mass %, a thickness from a first surface in a thickness direction of the fiber-reinforced resin molding material to a position occupied by 10 mass % of the resin composition is represented by d1 (μm), and a thickness from a second surface opposite to the first surface to a position occupied by 10 mass % of the resin composition is represented by d2 (μm). In this case, an absolute value (|d1−d2|) of the difference between d1 and d2 is 50 μm or less, preferably 20 μm or less, and more preferably 15 m or less. Ina case where the absolute value of the difference between d1 and d2 is equal to or less than the upper limit value of the above range, an excessive increase in tackiness of a surface of the fiber-reinforced resin molding material is easily suppressed. Accordingly, for example, even in a case where a plurality of fiber-reinforced resin molding materials are misaligned when being laminated, and the fiber-reinforced resin molding materials laminated once are re-laminated, the fiber-reinforced resin molding materials are less likely to further adhere to each other, and the work is thus facilitated.

The sum of d1 and d2 is preferably 10 μm or greater and 1,500 μm or less. The sum of d1 and d2 is more preferably 15 μm or greater and 1,200 μm or less, even more preferably 20 μm or greater and 1,000 μm or less, and particularly preferably 30 μm or greater and 800 μm or less. In a case where the sum of d1 and d2 is 10 μm or greater, more preferably 15 μm or greater, even more preferably 20 μm or greater, and particularly preferably 30 μm or greater, an excessive increase in tackiness of the fiber-reinforced resin molding material is easily suppressed. Accordingly, for example, even in a case where a plurality of fiber-reinforced resin molding materials are misaligned when being laminated, and the fiber-reinforced resin molding materials laminated once are re-laminated, the fiber-reinforced resin molding materials are less likely to further adhere to each other, and the work is thus facilitated. In a case where the sum of d1 and d2 is 1.500 μm or less, more preferably 1,200 μm or less, even more preferably 1,000 μm or less, and particularly preferably 800 μm or less, the fiber-reinforced resin molding material has sufficient tackiness, and thus the fiber-reinforced resin molding materials laminated are less likely to misalign.

In the invention, the first surface in the thickness direction is a surface on the lower side (in the direction of gravity) in manufacturing of the fiber-reinforced resin molding material. In a case where the fiber-reinforced resin molding material is manufactured by a manufacturing apparatus 100 illustrated in FIG. 1, the first surface is in contact with a carrier film conveying portion 14. The second surface on the opposite side is a surface positioned on the opposite side to the first surface.

Furthermore, in the fiber-reinforced resin molding material according to the invention, a ratio R ((d1+d2)/(basis weight)) of the sum (μm) of d1 and d2 to the basis weight (g/m²) of the reinforcement fiber sheet is preferably within a range of 0.2 or greater and 0.5 or less. The ratio R is more preferably 0.2 or greater and 0.4 or less, and even more preferably 0.25 or greater and 0.3 or less.

This is because in a case where the value of R is 0.2 or greater, and more preferably 0.25 or greater, there is a tendency that an excessive increase in tackiness of the fiber-reinforced resin molding material is easily suppressed. In addition, in a case where the value of R is 0.5 or less, more preferably 0.4 or less, and even more preferably 0.3 or less, the fiber-reinforced resin molding material has sufficient tackiness, and thus there is a tendency that the fiber-reinforced resin molding materials laminated are less likely to misalign.

The thickness d1 is preferably 5 μm or greater and 750 μm or less, more preferably 7 μm or greater and 600 μm or less, even more preferably 10 μm or greater and 500 μm or less, and particularly preferably 15 μm or greater and 400 μm or less. In a case where the thickness d1 is 5 μm or greater, more preferably 7 μm or greater, even more preferably 10 μm or greater, and particularly preferably 15 μm or greater, an excessive increase in tackiness of the first surface of the fiber-reinforced resin molding material is easily suppressed. Accordingly, for example, even in a case where a plurality of fiber-reinforced resin molding materials are misaligned when being laminated, and the fiber-reinforced resin molding materials laminated once are re-laminated, the fiber-reinforced resin molding materials are less likely to further adhere to each other, and the work is thus facilitated. In a case where the thickness d1 is 750 μm or less, more preferably 600 μm or less, even more preferably 500 μm or less, and particularly preferably 400 μm or less, the first surface of the fiber-reinforced resin molding material has sufficient tackiness, and thus the fiber-reinforced resin molding materials laminated are less likely to misalign.

A preferable range of the thickness d2 is preferably 5 μm or greater and 750 μm or less, more preferably 7 μm or greater and 600 μm or less, even more preferably 10 μm or greater and 500 μm or less, and particularly preferably 15 un or greater and 400 μm or less in view of tackiness of the second surface as in the case of the thickness d1.

A fiber volume fraction (Vf) of the fiber-reinforced resin molding material according to the invention is preferably 45 volume % or greater and 75 volume % or less, more preferably 50 volume % or greater and 70 volume % or less, and even more preferably 55 volume % or greater and 65 volume % or less. In a case where the fiber volume fraction (Vf) is 45 volume % or greater, more preferably 50 volume % or greater, and even more preferably 55 volume % or greater, a high-strength fiber-reinforced resin molded article is easily obtained. In a case where the fiber volume fraction (Vf) is 75 volume % or less, more preferably 70 volume % or less, and even more preferably 65 volume % or less, a fiber-reinforced resin molded article with excellent impregnation properties and appearance, in which resin deficiency is easily suppressed, is easily obtained.

The fiber volume fraction (Vf) is a value obtained by the measurement method according to JIS K7075.

The resin composition preferably contains a thermosetting resin. Examples of the thermosetting resin include an epoxy resin, a vinyl ester resin, an unsaturated polyester resin, a polyimide resin, a maleimide resin, and a phenol resin. The thermosetting resins may be used singly or in combination of two or more types thereof.

The thermosetting resin is preferably an epoxy resin or a vinyl ester resin in view of adhesion to carbon fibers, and more preferably a vinyl ester resin in view of the fact that a fiber-reinforced resin molding material with which a lightweight and high-strength fiber-reinforced resin molded article can be easily manufactured is easily obtained.

The vinyl ester resin is preferably a resin obtained through an addition reaction of an epoxy compound having two or more epoxy groups in the molecule, a (meth)acrylic acid, and an optional polybasic acid or anhydride thereof.

Examples of the epoxy compound include epoxy resins such as bisphenol A epoxy resins, bisphenol F epoxy resins, hydrogenated bisphenol epoxy resins, phenol novolac epoxy resins, and cresol novolac epoxy resins; glycidyl ether of polyhydric alcohols such as neopentyl glycol diglycidyl ether, polypropylene glycol diglycidyl ether, and trimethylolpropane triglycidyl ether; and glycidyl ester of polybasic acids such as phthalic acid diglycidyl ester and dimer acid diglycidyl ester. The epoxy compounds may be used singly or in combination of two or more types thereof.

Examples of the polybasic acids or anhydrides thereof include $\alpha,\beta$-unsaturated dibasic acids such as maleic acid, maleic anhydride, fumaric acid, and itaconic acid; saturated dibasic acids such as oxalic acid, malonic acid, and succinic acid; pyromellitic acid; trimellitic acid; trimer acid; polybutadiene having a carboxyl group; butadiene-acrylonitrile copolymers having a carboxyl group; and compounds having a carboxyl group at a terminal, obtained by esterification of $\alpha,\beta$-unsaturated dibasic acid and/or saturated dibasic acid and polyhydric alcohols. The polybasic acids or anhydrides thereof may be used singly or in combination of two or more types thereof.

The content of the thermosetting resin in the resin composition is preferably 30 volume % or greater and 50 volume % or less, and more preferably 35 volume % or greater and 45 volume % or less with respect to the total volume of the resin composition. In a case where the content of the thermosetting resin is equal to or greater than the lower limit value of the above range, a high-strength fiber-reinforced resin molded article is easily obtained. In a case where the content of the thermosetting resin is equal to or less than the upper limit value of the above range, a fiber-reinforced resin molded article with excellent impregnation properties and appearance, in which resin deficiency is easily suppressed, is easily obtained.

The resin composition may contain a thermoplastic resin such as a polyamide resin and a polyolefin resin.

The resin composition may contain additives such as a curing agent, a flame retardant, a weather resistance improver, an antioxidant, a heat stabilizer, an ultraviolet absorber, a plasticizer, a lubricant, a colorant, a compatibilizing agent, and a conductive filler according to properties required for the fiber-reinforced resin molded article. These additives may be used singly or in combination of two or more types thereof.

As the curing agent, known curing agents suitable for the resin composition to be used can be used. For example, a general organic peroxide is preferable in a case where a vinyl ester resin or an unsaturated polyester resin is used. In a case where an epoxy resin is used, an amine-based or acid anhydride-based curing agent is preferable.

As described above, in the fiber-reinforced resin molding material according to the invention, the above-described reinforcement fiber sheet formed of at least one selected from a unidirectional sheet, a woven fabric, and a non-crimp fabric, and having a basis weight of 200 g/m$^2$ or greater and 3,000 g/m$^2$ or less is impregnated with a resin composition such that the content of the resin composition is 25 volume % or greater and 55 volume % or less. In a case where the reinforcement fiber sheet has a high basis weight so as to satisfy the above range, the number of fiber-reinforced resin molding materials to be laminated can be reduced even in manufacturing of a fiber-reinforced resin molded article having a large thickness. In addition, since the content of the resin composition is as small as to satisfy the above range, it is possible to suppress an excessive increase in tackiness of the surface of the fiber-reinforced resin molding material. Accordingly, for example, even in a case where a plurality of fiber-reinforced resin molding materials are misaligned when being laminated, and the fiber-reinforced resin molding materials laminated once are re-laminated, the fiber-reinforced resin molding materials are less likely to further adhere to each other, and the work is thus facilitated. Therefore, a fiber-reinforced resin molded article can be easily manufactured using the fiber-reinforced resin molding material according to the invention.

Since the content of the resin composition is small, the weight of the fiber-reinforced resin molded article can be reduced, and since the content of the continuous fibers is relatively large, a high-strength fiber-reinforced resin molded article can be obtained.

[Method for Manufacturing Fiber-Reinforced Resin Molding Material]

A method for manufacturing a fiber-reinforced resin molding material according to the invention is a method for manufacturing the above-described fiber-reinforced resin molding material according to the invention. In the method for manufacturing a fiber-reinforced resin molding material, a fiber-reinforced resin molding material is obtained in which a reinforcement fiber sheet formed of at least one selected from the group consisting of a unidirectional sheet in which a plurality of continuous fibers are arranged in parallel in one direction, a woven fabric in which continuous fibers are woven, and a non-crimp fabric containing continuous fibers, and having a basis weight of 200 g/m$^2$ or greater and 3,000 g/m$^2$ or less is impregnated with a resin composition, and the content of the resin composition is 25 volume % or greater and 55 volume % or less.

Hereinafter, an example of the method for manufacturing a fiber-reinforced resin molding material will be described based on FIG. 1.

Dimensions and the like of the drawings represented in the following description are merely examples. The invention is not necessarily limited thereto, and can be appropriately modified and implemented without changing the gist of the invention.

In this embodiment, a fiber-reinforced resin molding material manufacturing apparatus 100 illustrated in FIG. 1 (hereinafter, simply referred to as "manufacturing apparatus 100") is used. In the following description, an XYZ rectangular coordinate system is set, and positional relationships between members will be described with reference to the XYZ rectangular coordinate system as necessary.

The manufacturing apparatus 100 includes a reinforcement fiber sheet supply portion 10, a first unwinder 12, a carrier film conveying portion 14, a first coating portion 16, a second unwinder 18, a second coating portion 20, an impregnation portion 22, and a winder 24.

The first unwinder 12 is provided with a first raw sheet roll R1 on which a long first carrier film C1 is wound. Along first carrier film C1 is unwound from the first raw sheet roll R1 by the first unwinder 12, and supplied to the carrier film conveying portion 14.

The carrier film conveying portion 14 includes a conveyor 15 in which an endless belt 15$c$ is hung between a pair of pulleys 15$a$ and 15$b$. In the conveyor 15, the endless belt 15$c$ is circulated by rotating the pair of pulleys 15$a$ and 15$b$ in the same direction, and the first carrier film C1 is conveyed to the right in the X-axis direction on a surface of the endless belt 15$c$. For example, a mesh belt can be used as the endless belt 15$c$.

The first coating portion 16 is positioned immediately above the carrier film conveying portion 14 on the side of the pulley 15$a$, and includes a doctor blade 17 which applies a resin composition P. In a case where the first carrier film C1 passes through the first coating portion 16, the resin composition P of a predetermined thickness is coated on a surface of the first carrier film C1 by the doctor blade 17, and a first resin sheet S1 is formed. The first resin sheet S1 travels along with conveyance of the first carrier film C1.

The reinforcement fiber sheet supply portion 10 supplies a long reinforcement fiber sheet F. In this example, in the reinforcement fiber sheet supply portion 10, a raw sheet roll R in which the reinforcement fiber sheet F is wound around a bobbin is rotatably held by a creel. The reinforcement fiber sheet F supplied by the reinforcement fiber sheet supply portion 10 is continuously laminated on the first resin sheet S1 traveling along with conveyance of the first carrier film C1 by guide rolls 11.

The second unwinder 18 is provided with a second raw sheet roll R2 on which a long second carrier film C2 is wound. By the second unwinder 18, a long second carrier film C2 is unwound from the second raw sheet roll R2, and by a plurality of guide rolls 19, the long second carrier film is supplied to a downstream side of a position to which the reinforcement fiber sheet F on the carrier film conveying portion 14 is supplied. The second carrier film C2 unwound from the second unwinder 18 is conveyed in a direction (on the left side in the X-axis direction) opposite to the conveyance direction of the first carrier film C1, and then the conveyance direction is reversed by the plurality of guide rolls 19 to the same direction as that of the first carrier film C1.

The second coating portion 20 is positioned immediately above the second carrier film C2 conveyed in the direction opposite to the conveyance direction of the first carrier film C1, and includes a doctor blade 21 which applies a resin composition P. In a case where the second carrier film C2 passes through the second coating portion 20, the resin composition P of a predetermined thickness is coated on a surface of the second carrier film C2 by the doctor blade 21, and a second resin sheet S2 is formed. The second resin sheet S2 travels along with conveyance of the second carrier film C2.

The impregnation portion 22 bonds and presses the second resin sheet S2 on the reinforcement fiber sheet F to impregnate the reinforcement fiber sheet F with the resin composition P, thereby providing a fiber-reinforced resin molding material. The impregnation portion 22 is positioned on a downstream side of a position to which the reinforcement fiber sheet F on the carrier film conveying portion 14 is supplied. The impregnation portion 22 includes a plurality of pressing rolls 23. The plurality of pressing rolls 23 are disposed in contact with the back surface of the second carrier film C2 reversed in the same direction as that of the first carrier film C1, that is, the surface on the opposite side to the second resin sheet S2.

In the impregnation portion 22, the first carrier film C1 and the second carrier film C2 are overlapped with the first resin sheet S1, the reinforcement fiber sheet F, and the second resin sheet S2 sandwiched therebetween, and conveyed while being pressed by the plurality of pressing rolls 23. Accordingly, the resin composition P of the first resin sheet S1 and the second resin sheet S2 is impregnated into the reinforcement fiber sheet F, and a raw sheet R3 formed of a fiber-reinforced resin molding material is obtained.

The raw sheet R3 is wound around the winder 24. The raw sheet R3 can be cut into a predetermined length and used for molding. The first carrier film C1 and the second carrier film C2 are peeled off from the fiber-reinforced resin molding material before molding.

In the method for manufacturing a fiber-reinforced resin molding material using the manufacturing apparatus 100, a long first carrier film C1 is unwound from the first raw sheet roll R1 by the first unwinder 12, and supplied to the carrier film conveying portion 14. By the first coating portion 16, a resin composition P of a predetermined thickness is coated on a surface of the first carrier film C1, and a first resin sheet S1 is formed. By conveying the first carrier film C1 by the carrier film conveying portion 14, the first resin sheet S1 on the first carrier film C1 is caused to travel.

As the resin composition P, a resin composition having an initial viscosity of 1 Pa·s or less and having a viscosity of 5,000 Pa·s or greater and 150,000 Pa·s or less after leaving for 7 days at 25° C. after preparation is preferably used. Using the resin composition, a fiber-reinforced resin molding material having a high basis weight and a low resin content can be easily manufactured.

The initial viscosity of the resin composition is measured at 25° C. using a B-type viscometer according to JIS 8803 immediately after the preparation of the resin composition.

The initial viscosity of the resin composition is preferably 0.05 Pa·s or greater and 1 Pa·s or less, more preferably 0.075 Pa·s or greater and 0.75 Pa·s or less, and even more preferably 0.1 Pa·s or greater and 0.55 Pa·s or less. In a case where the initial viscosity of the resin composition is 1 Pa·s or less, more preferably 0.75 Pa·s or less, and even more preferably 0.55 Pa·s or less, the impregnation properties of the resin composition into the reinforcement fiber sheet become more excellent, and the resin composition is easily impregnated into the inside of the reinforcement fiber sheet in a thickness direction. In a case where the initial viscosity of the resin composition is 0.05 Pa·s or greater, more preferably 0.075 Pa·s or greater, and even more preferably 0.1 Pa·s or greater, a high-strength fiber-reinforced resin molded article is easily obtained.

The viscosity of the resin composition after leaving for 7 days at 25° C. after preparation is preferably 5,000 Pa·s or greater and 150,000 Pa·s or less, more preferably 7,500 Pa·s or greater and 150.000 Pa·s or less, and even more preferably 10,000 Pa·s or greater and 150,000 Pa·s or less. In a case where the viscosity of the resin composition after leaving is 5.00 Pa·s or greater, more preferably 7,500 Pa·s or greater, and even more preferably 10.000 Pa·s or greater, a high-strength fiber-reinforced resin molded article is easily obtained. In a case where the viscosity of the resin composition after leaving is 150,000 Pa·s or less, the impregnation properties of the resin composition into the reinforcement fiber sheet become more excellent, and the resin composition is easily impregnated into the inside of the reinforcement fiber sheet in a thickness direction.

The viscosity of the resin composition after leaving is measured at 25° C. using a digital viscometer HBDV-I+ Prime manufactured by AMETEK, Inc. according to JIS 8803 after the prepared resin composition is left for 7 days at 25° C.

In addition, a reinforcement fiber sheet F is unwound from the raw sheet roll R by the reinforcement fiber sheet supply portion 10, and continuously supplied and laminated on the first resin sheet S1 by the guide rolls 11. As the reinforcement fiber sheet F, a reinforcement fiber sheet formed of at least one selected from the group consisting of a unidirectional sheet in which a plurality of continuous fibers are arranged in parallel in one direction, a woven fabric in which continuous fibers are woven, and a non-crimp fabric containing continuous fibers, and having a basis weight of 200 g/m$^2$ or greater and 3,000 g/m$^2$ or less is used.

A long second carrier film C2 is unwound from the second raw sheet roll R2 by the second unwinder 18, and a resin composition P of a predetermined thickness is coated on a surface of the second carrier film C2 by the second coating portion 20 to form a second resin sheet S2. As the resin composition P which forms the second resin sheet S2, the same one as the resin composition P which forms the first resin sheet S1 is preferable.

By conveying the second carrier film C2, the second resin sheet S2 is caused to travel. The second resin sheet S2 is bonded on the reinforcement fiber sheet F, and pressed by the plurality of pressing rolls 23 in the impregnation portion 22. The resin composition P of the first resin sheet S1 and the second resin sheet S2 is impregnated into the reinforcement fiber sheet F. Accordingly, a raw sheet R3 is obtained in which the fiber-reinforced resin molding material having the reinforcement fiber sheet F impregnated with the resin composition P is interposed between the first carrier film C1 and the second carrier film C2. The raw sheet R3 is wound around the winder 24.

According to the method for manufacturing a fiber-reinforced resin molding material of the invention described above, a fiber-reinforced resin molding material with which a lightweight and high-strength fiber-reinforced resin molded article can be easily obtained can be manufactured.

The method for manufacturing a fiber-reinforced resin molding material according to the invention is not limited to the method using the above-described manufacturing apparatus 100.

[Fiber-Reinforced Resin Molded Article]

A fiber-reinforced resin molded article according to the invention is obtained by heating and pressing the fiber-reinforced resin molding material according to the invention. In order to obtain the fiber-reinforced resin molded article according to the invention, for example, a plurality of fiber-reinforced resin molding materials according to the invention are laminated, and then the laminate is heated under pressure applied thereto to cure the thermosetting resin.

The molding method is not particularly limited, and examples thereof include a press molding method, an autoclave molding method, and a bagging molding method.

Uses of the fiber-reinforced resin molded article according to the invention are not particularly limited, and examples thereof include sports purposes; general industrial purposes such as structural materials such as vehicles, ships, and railway vehicles; and aerospace purposes.

Since the fiber-reinforced resin molding material according to the invention is used for the fiber-reinforced resin molded article according to the invention described above, the fiber-reinforced resin molded article can be easily manufactured. In addition, it is lightweight and has a high strength.

EXAMPLES

Hereinafter, the invention will be described in detail with examples, but is not limited by the following description.

[Measurement of Viscosity]

Regarding an initial viscosity of a resin composition, a resin composition immediately after preparation was used, and the initial viscosity was measured at 25° C. using a B-type viscometer according to JIS 8803.

The viscosity of the resin composition after leaving is measured at 25° C. using a digital viscometer HBDV-I+ Prime manufactured by AMETEK, Inc. according to JIS 8803 after the prepared resin composition is left for 7 days at 25° C.

[Measurement of d1 and d2]

Three different thickest portions in a cross-section of the fiber-reinforced resin molding material obtained in each example were measured using a microscope/VHX-500 manufactured by KEYENCE CORPORATION, and an average value of the measurement results was defined as the values of d1 and d2.

[Reinforcement Fiber Sheet]

F-1: Non-crimp fabric containing continuous fibers formed of carbon fibers (product name "TKI600B", manufactured by TK Industries, basis weight: 600 g/m$^2$)

F-2: Non-crimp fabric containing continuous fibers formed of carbon fibers (product name "TKI300UD", manufactured by TK Industries, basis weight: 300 g/m$^2$)

F-3: Woven fabric provided by plain weaving of continuous fibers formed of carbon fibers (product name "TR3110", manufactured by Mitsubishi Chemical Corporation, basis weight: 200 g/m$^2$)

F-4: Fabric containing continuous fibers formed of aramid fibers (product name "Style 1356", manufactured by C. Cramer, Weberei, GmbH & Co. KG, basis weight: 470 g/m$^2$)

F-5: Non-crimp fabric containing continuous fibers formed of glass fibers (product name "GLASS KURAMAS UD600", manufactured by KURABO INDUSTRIES LTD., basis weight: 625 g/m$^2$)

[Resin Composition]

P-1: Vinyl ester resin (initial viscosity: 0.3 Pa·s, viscosity after leaving: 20,000 mPa·s)

[Re-Placing Properties]

One fiber-reinforced resin molding material obtained in each example was used and placed on a press, and then peeled off from the press and placed again thereon. Workability (re-placing properties) during this work was evaluated according to the following evaluation criteria.

<Evaluation Criteria>

A: Re-placing is possible with appropriate tackiness.

B: Tackiness (stickiness) is slightly felt, but re-placing is possible.

C: Little tackiness is felt, and re-placing can be smoothly performed.

D: Due to too high tackiness, re-placing is impossible while the prepreg shape is maintained. Otherwise, there is no tackiness, and thus the fiber-reinforced resin molding materials laminated are easily misaligned.

[Impregnation Properties]

The fiber-reinforced resin molding material obtained in each example was brought into contact with a cross-section of the central portion of the reinforcement fiber sheet to evaluate impregnation properties with the following evaluation criteria.

<Evaluation Criteria>

A: The resin composition is uniformly impregnated into the reinforcement fiber sheet in a cross-section direction.

B: The resin composition is non-uniformly impregnated into the reinforcement fiber sheet in a cross-section direction.

[Moldability]

Moldability in manufacturing of the fiber-reinforced resin molded article of each example was evaluated with the following evaluation criteria.

<Evaluation Criteria>

A: Since no burrs are shown in the fiber-reinforced resin molded article, good appearance is obtained.

B: Burrs, swells, or irregularities are generated in the fiber-reinforced resin molded article, or poor appearance is obtained due to resin deficiency.

Example 1

A reinforcement fiber sheet F-1 was bonded to a resin surface of a resin sheet in which a polyethylene film (carrier film) was coated with a resin composition P-1 using a doctor blade such that a basis weight was 235 g/m², another resin sheet was bonded to a surface on the side of the reinforcement fiber sheet F-1 in the same manner as described above, and these were pressed by a plurality of pressing rolls to obtain a fiber-reinforced resin molding material of 600 mm long×600 mm wide. The basis weight of the obtained fiber-reinforced resin molding material was 1.070 g/m the content of the resin composition was 44 mass %, and the fiber volume fraction was 46 volume %.

Four fiber-reinforced resin molding materials obtained were laminated, and heated and pressed by a press under the conditions of a temperature of 140° C. and a pressure of 8 MPa to obtain a plate-like fiber-reinforced resin molded article.

Examples 2 to 6 and Example 8

Fiber-reinforced resin molding materials were manufactured in the same manner as in Example 1, except that the type of the reinforcement fiber sheet to be used and the basis weight of the resin sheet were changed as shown in Table 1. Plate-like fiber-reinforced resin molded articles were manufactured in the same manner as in Example 1, except that the above fiber-reinforced resin molding materials were used.

Example 7

A fiber-reinforced resin molding material was manufactured in the same manner as in Example 6, except that a reinforcement fiber sheet F-1 was bonded to a resin surface of a resin sheet in which a polyethylene film (carrier film) was coated with a resin composition P-1 using a doctor blade such that a basis weight was 322 g/m² and a carrier film having no resin coating was laminated on a surface on the side of the reinforcement fiber sheet F-1, and a plate-like fiber-reinforced resin molded article was manufactured in the same manner as in Example 1.

Comparative Examples 1 and 2

A fiber-reinforced resin molding material was manufactured in the same manner as in Example 1, except that the basis weight of the resin sheet was changed as shown in Table 1. A plate-like fiber-reinforced resin molded article was manufactured in the same manner as in Example 1, except that the above fiber-reinforced resin molding material was used.

The manufacturing conditions and the evaluation results of the examples and the comparative Examples are shown in Table 1. In Table 1, "F-1*2" means that two reinforcement fiber sheets F-1 were laminated and used.

TABLE 1

| | | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|---|
| Reinforcement Fiber Sheet | Type | — | F-1 | F-2 | F-3 | F-4 | F-5 | F-1 | F-1 | F-1*2 | F-1 | F-1 |
| | Basis Weight | g/m² | 600 | 300 | 200 | 470 | 625 | 600 | 600 | 1,200 | 600 | 600 |
| Resin | Type | — | P-1 | P-1 | P-1 | P-1 | P-1 | P-1 | P-1 | P-1 | P-1 | P-1 |
| | Initial Viscosity | Pa·s | 0.3 | 0.3 | 0.3 | 0.3 | 0.3 | 0.3 | 0.3 | 0.3 | 0.3 | 0.3 |
| | Viscosity After Leaving | Pa·s | 20,000 | 20,000 | 20,000 | 20,000 | 20,000 | 20,000 | 20,000 | 20,000 | 20,000 | 20,000 |
| Resin Sheet | Basis Weight (total) | g/m² | 470 | 192 | 46 | 256 | 164 | 322 | 322 | 930 | 500 | 124 |
| Fiber-Reinforced Resin Molding Material | Basis Weight | g/m² | 1,070 | 492 | 246 | 726 | 789 | 922 | 922 | 2,130 | 1,100 | 724 |
| | Resin Composition Content | mass % | 44 | 39 | 19 | 35 | 21 | 35 | 35 | 44 | 45 | 17 |
| | | volume % | 54 | 49 | 26 | 40 | 36 | 45 | 45 | 54 | 56 | 24 |
| | Fiber Volume Fraction | volume % | 46 | 51 | 74 | 60 | 64 | 55 | 55 | 46 | 44 | 76 |
| | d1 | μm | 61 | 36 | 49 | 62 | 82 | 70 | 61 | 121 | 60 | 90 |
| | d2 | μm | 61 | 36 | 49 | 62 | 82 | 70 | 79 | 121 | 60 | 90 |
| | \|d1 − d2\| | μm | 0 | 0 | 0 | 0 | 0 | 0 | 18 | 0 | 0 | 0 |
| | R | | 0.20 | 0.24 | 0.49 | 0.26 | 0.26 | 0.23 | 0.23 | 0.20 | 0.20 | 0.30 |
| | Re-placing Properties | | B | B | C | A | A | A | B | B | D | D |
| | Impregnation Properties | | A | A | A | A | A | A | A | A | A | B |
| | Moldability | | A | A | A | A | A | A | A | A | B | B |

As shown in Table 1, in Examples 1 to 8 using the fiber-reinforced resin molding material according to the invention, the impregnation properties of the resin composition into the reinforcement fiber sheet was good, and the fiber-reinforced resin molding material had good re-placing properties. In addition, the fiber-reinforced resin molded article had good appearance due to excellent moldability.

In Comparative Example 1 using the fiber-reinforced resin molding material with an excessive resin composition content, the surface tackiness of the fiber-reinforced resin molding material was too high. Accordingly, it was difficult to re-laminate the fiber-reinforced resin molding materials, and the re-placing properties were poor. Furthermore, burrs were generated in the obtained fiber-reinforced resin molded article, and the moldability was inferior. In Comparative Example 2 using the fiber-reinforced resin molding material with an excessively small resin composition content, the resin composition was non-uniformly impregnated into the reinforcement fiber sheet, and thus resin deficiency occurred and the fiber-reinforced resin molded article had poor appearance. Furthermore, since the surface tackiness was too low, the fiber-reinforced resin molding materials laminated were easily misaligned, and the lamination workability was poor.

INDUSTRIAL APPLICABILITY

It is possible to provide a lightweight and high-strength fiber-reinforced resin molded article using a fiber-reinforced resin molding material according to the invention. In addition, it is possible to provide a method for manufacturing a fiber-reinforced resin molding material with which a lightweight and high-strength fiber-reinforced resin molded article can be easily obtained.

REFERENCE SIGNS LIST

- 10: reinforcement fiber sheet supply portion
- 12: first unwinder
- 14: carrier film conveying portion
- 16: first coating portion
- 18: second unwinder
- 20: second coating portion
- 22: impregnation portion
- 24: winder
- 100: fiber-reinforced resin molding material manufacturing apparatus
- F: reinforcement fiber sheet
- P: resin composition
- C1: first carrier film
- C2: second carrier film
- S1: first resin sheet
- S2: second resin sheet

The invention claimed is:

1. A method for manufacturing a fiber-reinforced resin molding material, the method comprising:
    coating a resin composition on one surface of each of a first carrier film and a second carrier film; and
    impregnating a reinforced fiber sheet with the resin composition after the coating by overlaying the first and second carrier films so that the surfaces coated by the resin composition face each other and in a state that the reinforced fiber sheet is put between the first and second carrier films, and conveying while pressing with a plurality of pressing rolls,
    wherein the reinforced fiber sheet is one selected from the group consisting of (i) a woven fabric in which continuous fibers are woven and (ii) a non-crimp fabric comprising continuous fibers,
    wherein the reinforcement fiber sheet has a basis weight in a range of from 200 to 3,000 g/m$^2$,
    wherein the reinforced fiber sheet is impregnated so that an amount of the resin composition in the fiber-reinforced resin molding material is in a range of from 25 to 55 vol. %, and
    wherein, when a total amount of the resin composition contained in the fiber-reinforced resin molding material is 100 mass %, a thickness from a first surface in a thickness direction of the fiber-reinforced resin molding material to a position occupied by 10 mass % of the resin composition is represented by d1 (μm), and a thickness from a second surface opposite to the first surface to a position occupied by 10 mass % of the resin composition is represented by d2 (μm), an absolute value (|d1−d2|) of a difference between d1 and d2 is 50 μm or less.

2. The method of claim 1, wherein the resin composition has an initial viscosity of 1 Pa·s or less and a viscosity in a range of from 5,000 to 150,000 Pa·s after leaving for 7 days at 25° C.

3. The method of claim 1, wherein the resin composition comprises at least one thermosetting resin selected from the group consisting of an epoxy resin, a vinyl ester resin, an unsaturated polyester resin, a polyimide resin, a maleimide resin, and a phenol resin.

4. The method of claim 3, wherein the resin composition comprises a vinyl ester resin.

5. The method of claim 1, wherein the continuous fibers are continuous fibers selected from the group consisting of carbon fibers, glass fibers, and aramid fibers.

6. The method of claim 1, wherein the reinforced fiber sheet is a non-crimp fabric comprising continuous fibers.

7. The method of claim 1, wherein R, representing a ratio of a sum of d1 and d2 to the basis weight of the reinforcement fiber sheet, is in a range of from 0.2 to 0.5.

8. The method of claim 1, wherein d1 and/or d2 is in a range of from 5 to 750 μm.

9. The method of claim 1, wherein the resin composition has an initial viscosity of 1 Pa·s or less and a viscosity in a range of from 5,000 to 150,000 Pa·s after leaving for 7 days at 25° C., and
    wherein the resin composition comprises at least one thermosetting resin selected from the group consisting of an epoxy resin, a vinyl ester resin, an unsaturated polyester resin, a polyimide resin, a maleimide resin, and a phenol resin.

10. The method of claim 1, wherein the resin composition has an initial viscosity of 1 Pa·s or less and a viscosity in a range of from 5,000 to 150,000 Pa·s after leaving for 7 days at 25° C., and
    wherein the resin composition comprises a vinyl ester resin.

11. The method of claim 1, wherein the resin composition has an initial viscosity of 1 Pa·s or less and a viscosity in a range of from 5,000 to 150,000 Pas after leaving for 7 days at 25° C., and
    wherein the reinforced fiber sheet is a non-crimp fabric comprising continuous fibers.

12. The method of claim 1, wherein the resin composition has an initial viscosity of 1 Pa·s or less and a viscosity in a range of from 5,000 to 150,000 Pas after leaving for 7 days at 25° C.,
    wherein the reinforced fiber sheet is a non-crimp fabric comprising continuous fibers, and
    wherein the resin composition comprises a vinyl ester resin.

* * * * *